United States Patent
Katayama (10) Patent No.: US 7,023,787 B2
(45) Date of Patent: Apr. 4, 2006

(54) OPTICAL PICKUP DEVICE

(75) Inventor: Tadanori Katayama, Higashi-Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 453 days.

(21) Appl. No.: 10/375,047

(22) Filed: Feb. 28, 2003

(65) Prior Publication Data
US 2003/0169664 A1 Sep. 11, 2003

(30) Foreign Application Priority Data
Mar. 1, 2002 (JP) .......................... P2002-056169

(51) Int. Cl.
*G11B 7/00* (2006.01)
(52) U.S. Cl. ........................ 369/112.01; 369/112.28; 369/112.29
(58) Field of Classification Search ............. 369/53.26, 369/116; 372/29.021, 29.014
See application file for complete search history.

(56) References Cited

U.S. PATENT DOCUMENTS

| | | | |
|---|---|---|---|
| 5,526,338 A | 6/1996 | Hasman | |
| 6,650,612 B1 * | 11/2003 | Matsuzaki et al. | 369/112.05 |
| 2002/0105892 A1 | 8/2002 | Onishi | |
| 2002/0118611 A1 * | 8/2002 | Kim et al. | 369/44.11 |

FOREIGN PATENT DOCUMENTS

| | | |
|---|---|---|
| CN | 1428774 | 7/2003 |
| JP | 63157335 A | 6/1988 |
| JP | 4332185 A | 11/1992 |
| JP | 7201066 A | 8/1995 |
| JP | 8339571 A | 12/1996 |
| JP | 2000-331365 A | 11/2000 |
| JP | 2001-052368 | 2/2001 |
| JP | 2001-118281 | 4/2001 |
| JP | 2001-143305 A | 5/2001 |
| JP | 2003-187490 | 7/2003 |
| WO | WO-2001/95317 A1 | 12/2001 |

OTHER PUBLICATIONS

Chinese Office Action issued Sep. 24, 2004, with English translation.

* cited by examiner

*Primary Examiner*—Thang V. Tran
*Assistant Examiner*—Tawfik Goma
(74) *Attorney, Agent, or Firm*—Morrison & Foerster LLP (57) ABSTRACT

An optical pickup device has a first combination reception and emission device (1) which emits laser beams (10) to an optical disk, and a second combination reception and emission device (2) which emits laser beams (11) having a wavelength different from that of the laser beams (10) to an optical disk. A DBS (3) is disposed on a path of the laser beams for making axes (12, 13) of the laser beams coincident with each other at an output side. A monitoring light detection element (9) is disposed near and above the DBS such that a light-receiving surface of the monitoring light detection element is substantially parallel with the optical axes (12, 13) of the laser beams (10, 11). The monitoring light detection element (9) receives laser beams outside of an effective region emitted by the first and second combination reception and emission devices (1, 2).

13 Claims, 8 Drawing Sheets

Fig. 14    BACKGROUOND ART

OPTICAL PICKUP DEVICE

BACKGROUND OF THE INVENTION

The present invention relates to an optical pick-up device for performing at least one operation of reproduction, erase, and recording of information upon an information-recording medium.

Figure 14:
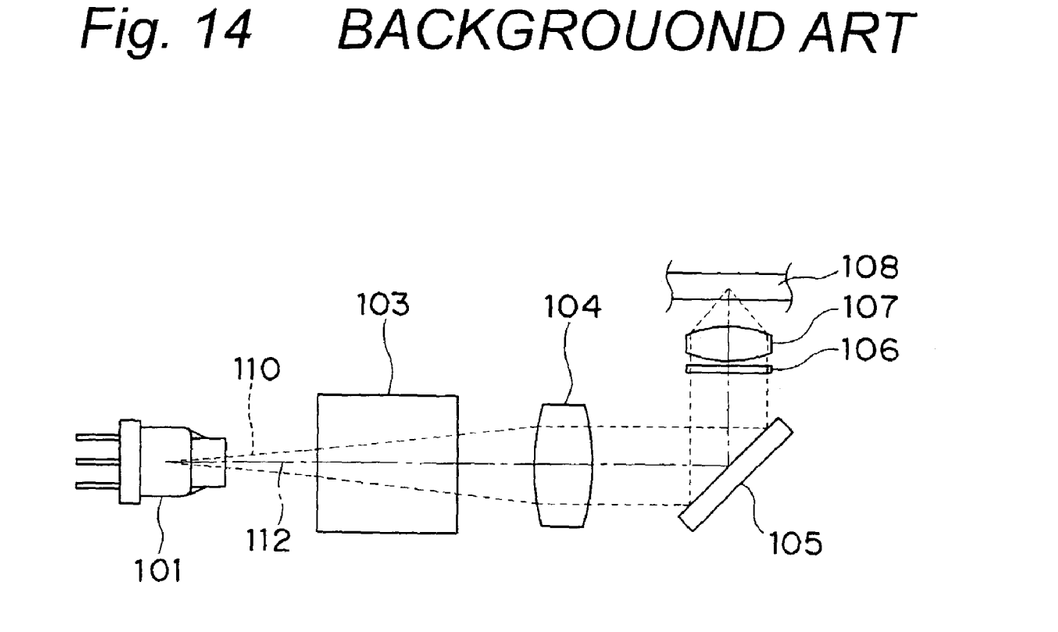
FIG. 14 is an illustration showing the construction of a background-art optical pickup device as viewed sideways.
Figure 15:
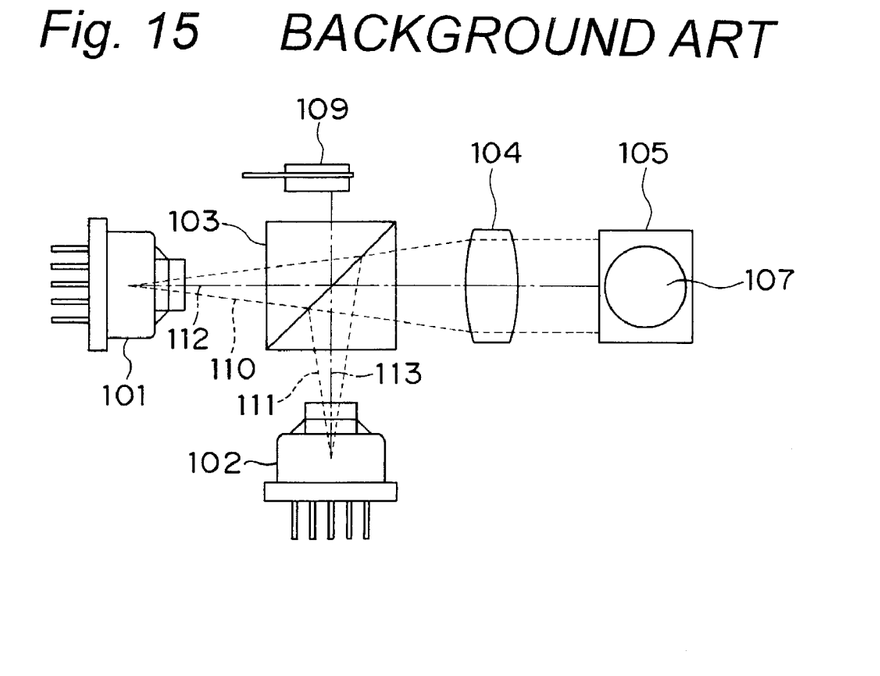
FIG. 15 is an illustration showing the construction of the optical pickup device of FIG. 14 as viewed from above.

As the optical pickup device of the above kind, there is a device as shown in FIGS. 14 and 15. FIG. 14 is an illustration showing the construction of the optical pick-up device as viewed sideways. FIG. 15 is an illustration showing the construction of the optical pick-up device as viewed from above. Shown in FIGS. 14 and 15 are a first and a second combination reception and emission devices (for example, hologram laser elements or laser couplers) 101 and 102 emitting laser beams having different wavelengths, a dichroic beam splitter 103 (hereinafter referred to as "DBS"), a collimator lens 104, a riser mirror 105, a quater-wave plate 106, an objective lens 107, an optical disk 108, a monitoring light detection element 109, laser beams 110 and 111 in an effective region, and optical axes 112 and 113 of the laser beams.

In the optical pickup device, as shown in FIG. 14, laser beams 110 in the effective region emitted by the first combination reception and emission device 101 pass through the DBS 103, and are then collimated by the collimator lens 104 and bent perpendicularly by the riser mirror 105, then pass through the quater-wave plate 106, and are finally condensed on a recording surface of the optical disk 108 by the objective lens 107. At this time, several percent of the laser beams 110 in the effective region emitted by the first combination reception and emission device 101 are reflected by the DBS 103 and enter the monitoring light detection element 109, as shown in FIG. 15. The monitoring light detection element 109 outputs an electrical signal corresponding to a light amount of the laser beams incident thereon. The electrical signal drives an unshown automatic power control ("APC") circuit. The APC circuit controls the output of the first combination reception and emission device 101. Thus the laser beams condensed on the recording surface of the optical disk 108 come to have an appropriate power.

Several percent of the laser beams 111 in the effective region emitted by the second combination reception and emission device 102 pass through the DBS 103, whereas the remainder are reflected by the DBS 103. Laser beams reflected by the DBS 103 travel along the same optical path as that of the laser beams 110 of the first combination reception and emission device 101 and are condensed on the recording surface of the optical disk 108. Laser beams 111 that have passed through the DBS 103 are incident on the monitoring light detection element 109. Thereby as in the case of the output of the first combination reception and emission device 101, the output of the second combination reception and emission device 102 is APC-controlled by the APC circuit. Thus the laser beams condensed on the recording surface of the optical disk 108 come to have an appropriate power.

Laser beams reflected by the optical disk 108 return to the first combination reception and emission device 101 or the second combination reception and emission device 102 via the objective lens 107, the quater-wave plate 106, the riser mirror 105, the collimator lens 104, and the DBS 103. As a result, the laser beams reflected by the optical disk 108 are received by a light-receiving element (not shown) included in the first combination reception and emission device 101 or the second combination reception and emission device 102. As a result, information recorded on the optical disk 108 is detected.

Figure 16:
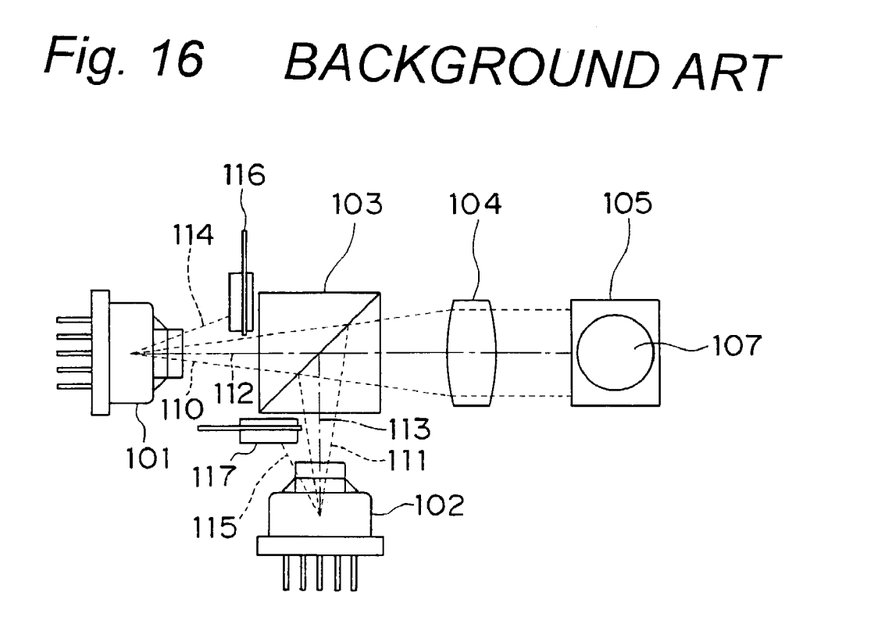
FIG. 16 is an illustration showing the construction of another background-art optical pickup device as viewed from above.

FIG. 16 shows the construction of another background-art optical pickup device as viewed from above. The same parts, shown in FIG. 16, as those shown in FIGS. 14 and 15 are denoted by the same reference numerals as those shown in FIGS. 14 and 15, and description thereof is omitted.

In the optical pickup device shown in FIG. 16, a monitoring light detection element 116 receives laser beams 114 outside of an effective region emitted by the first combination reception and emission device 101. A monitoring light detection element 117 receives laser beams 115 outside of an effective region emitted by the second combination reception and emission device 102. The APC circuit is driven by electric signals outputted from the monitoring light detection elements 116 and 117, thus controlling the output of the first and second combination reception and emission devices 101 and 102.

The DBS 103 has a film for controlling reflection/transmittance characteristics. The film is difficult to form and has a great change in its reflection/transmittance characteristics due to the change in temperature. In addition, the DBS 103 has great variations in dependence on products. Therefore when a plurality of optical pickup devices shown in FIGS. 14 and 15 are manufactured, there may be large variations in the relationship between the light amounts of the laser beams 110 and 111 emitted by the first and second combination reception and emission devices 101 and 102 and the light amounts of the laser beams incident on the monitoring light detection elements 109. Consequently the background-art optical pickup device has a problem that the range of adjustment of the control gain of the APC circuit must be wide.

The speed of recording information on a disk such as CD-R (recordable compact disk) and DVD-R (recordable digital versatile disk) is proportional to the power of the laser beams condensed on the recording surface of the optical disk. Therefore the higher the utilization efficiency of laser beams is, the higher the recording speed is.

The optical pickup device shown in FIGS. 14 and 15 has a problem that the power of the laser beams condensed on the recording surface of the optical disk 108 decreases by the light amount of the laser beams incident on the monitoring light detection element 109 through the DBS 103 and the recordable speed is lowered accordingly. The problem is connected greatly with the performance, quality, and reliability of the optical pickup device.

In contrast, in the optical pickup device shown in FIG. 16, the laser beams 114 and 115 outside the effective region are directed to the monitoring light detection elements 116 and 117. Thus there is no decrease in the power of the laser beams condensed on the recording surface of the optical disk.

The optical pickup device shown in FIG. 16 is not adversely affected by variations of the reflection/transmittance characteristics of the DBS 103. However, the optical pickup device requires two monitoring light detection elements 116 and 117. Thus use of the two monitoring light detection elements 116 and 117 invites the increase in the number of component parts and hence in work to dispose the component parts. Therefore the cost for manufacturing the optical pickup device shown in FIG. 16 is high.

The positions of the monitoring light detection elements 116 and 117 are close to the laser beams 110 and 111 in the effective region. Therefore if the monitoring light detection elements 116 and 117 are dislocated even a little, there is a fear of vignetting of the laser beams 110 and 111 in the effective region. That is, the laser beams 110 and 111 in the effective region may decrease in the amount. Such a situation is connected greatly with the performance, quality, and reliability of the optical pickup device.

SUMMARY OF THE INVENTION

Therefore, it is an object of the present invention to provide an optical pickup device that can narrow the adjustable range of the control gain of the APC circuit, increase the recording speed, and reduce the manufacturing cost.

In order to achieve the above object, an optical pickup device performing at least one of operations of reproduction, erase, and recording of information upon an information-recording medium, according to the present invention, includes a first light source emitting laser beams to an information-recording medium; a second light source emitting laser beams to an information-recording medium, the laser beams of the second light source having a wavelength different from that of the laser beams of the first light source and having an optical axis not parallel with that of the laser beams of the first light source; an optical element disposed such that the laser beams emitted by the first and second light sources travel via the optical element, the optical element making optical axes of the laser beams of the first and second light sources substantially coincident with each other at an output side of the optical element; and a monitoring light detection element receiving a part of the laser beams emitted by the first and second light sources. The monitoring light detection element has a light-receiving surface substantially parallel with the optical axes of the laser beams of the first and second light sources.

In the optical pickup device, laser beams emitted by the first and second light sources travel via the optical element and impinge upon the information-recording medium. At this time, the light-receiving surface of the monitoring light detection element is substantially parallel with the optical axes of the laser beams of the first and second light sources, so that laser beams outside of the effective region emitted by the first and second light sources get incident on the light-receiving surface of the monitoring light detection element. Since the monitoring light detection element receives the laser beams of the first and second light sources outside of the effective region, the amount of light received by the monitoring light detection element does not differ much among optical pickup devices. Therefore, when the output of the first and second light sources are controlled by an APC circuit, the adjustable range of the control gain of the APC circuit can be reduced.

Since the monitoring light detection element receives the laser beams outside the effective region, the amount of the laser beams applied to the information-recording medium does not decrease. Thus the recording speed for the information-recording medium is not prevented from decreasing.

Furthermore, because both the laser beams of the first light source and the laser beams of the second light source, both outside of the effective region, are incident on the light receiving surface of the same monitoring light detection element, only one monitoring light detection element is necessary for the APC control of the outputs of the first and second light sources. Thus the number of component parts can be decreased accordingly and thus the costs for manufacturing the optical pickup devices are held down.

The "information-recording medium" described herein should be understood to include an optical disk, a magneto optical disk, a phase change optical disk, and so on.

In one embodiment, at least one of the first and second light sources comprises a combination reception and emission device in which a light-emitting element is combined with a light-receiving element which receives laser beams reflected by the information-recording medium.

In the optical pickup device of the embodiment, at least one of the first and second light sources is a combination reception and emission device. Thus the number of component parts can be further decreased.

In one embodiment, at least one of the first and second light sources comprises a light-emitting element, and the light-emitting element is separate from a light-receiving element which receives laser beams reflected by the information-recording medium.

This arrangement makes it possible to increase the degree of freedom of designing of the optical system.

In one embodiment, the axis of the laser beams of the first light source is not orthogonal to the axis of the laser beams of the second light source. Also, the optical element is a polyhedron in which a surface of the polyhedron for receiving the laser beams of the first light source and a surface of the polyhedron for receiving the laser beams of the second light source non-orthogonally incline relative to each other.

This arrangement makes it possible to make the two non-orthogonal optical axes coincident with each other at the output side of the optical element. That is, it is possible to make the optical axis of the laser beams of the first light source and that of the laser beams of the second light source substantially coincident with each other at the output side of the optical element.

In one embodiment, the optical pickup device further includes a third light source, which emits laser beams of a wavelength different from the wavelengths of the laser beams of the first and second light sources to the information-recording medium. The optical element makes the optical axes of the laser beams of the first, second and third light sources substantially coincident with one another at an output side thereof.

In the optical pickup device, the wavelength of the laser beams emitted by the third light source is different from the wavelengths of the laser beams of the first and second light sources. Thus, for an information-recording medium which the first and second laser beams are incapable of coping with, the optical pickup device can perform at least one of reproduction, erase, and recording of information upon the medium, using the third light source.

In one embodiment, a surface of the optical element at a side of the monitoring light detection element inclines relative to a plane or planes including the optical axes of the laser beams of the first and second light sources.

Therefore it is possible to thin the optical element to such an extent that it does not interfere with the laser beams in the effective region.

In one embodiment, the optical element and the monitoring light detection element are integral with each other. This arrangement makes it possible to decrease the number of component parts.

In one embodiment, a first reflection mirror for increasing laser beams incident on the light-receiving surface of the monitoring light detection element is disposed on an end surface of the optical element.

Due to the provision of the first reflection mirror, the amount of laser beams incident on the monitoring light detection element increases, so that the laser beams incident thereon are reliably monitored.

In one embodiment, the first reflection mirror for increasing laser beams incident on the light-receiving surface of the monitoring light detection element is embedded in the optical element, so that the reflection mirror is not exposed to the outside.

In this case, too, it is possible to reliably monitor the laser beams incident on the monitoring light detection element.

Also, since the first reflection mirror is not exposed to the outside, the first reflection mirror is protected from bad influences such as corrosion and deterioration.

In one embodiment, a reflection surface of the first reflection mirror is curved to lead laser beams traveling from two different directions to the light-receiving surface of the monitoring light detection element. Therefore the laser beams outside of the effective region coming from the first and second light sources are well lead to and received by the light-receiving surface of the monitoring light detection element.

In one embodiment, a second reflection mirror for increasing laser beams incident on the light-receiving surface of the monitoring light detection element is disposed in the neighborhood of the optical element.

In the optical pickup device of the embodiment, due to the provision of the second reflection mirror in the neighborhood of the optical element, the laser beams incident on the monitoring light detection element increase and are monitored reliably.

In one embodiment, the second reflection mirror is formed by using a part of a casing accommodating the first light source, the second light source, the optical element, and the monitoring light detection element. This arrangement prevents the number of component parts from increasing.

BRIEF DESCRIPTION OF THE DRAWINGS

The present invention will become more fully understood from the detailed description given hereinbelow and the accompanying drawings which are given by way of illustration only, and thus are not limitative of the present invention, and therein.

DETAILED DESCRIPTION OF THE PREFERRED EMBODIMENTS (First Embodiment)

Optical pickup devices according to first through seventh embodiments of the present invention will be described in detail below.

Figure 1:
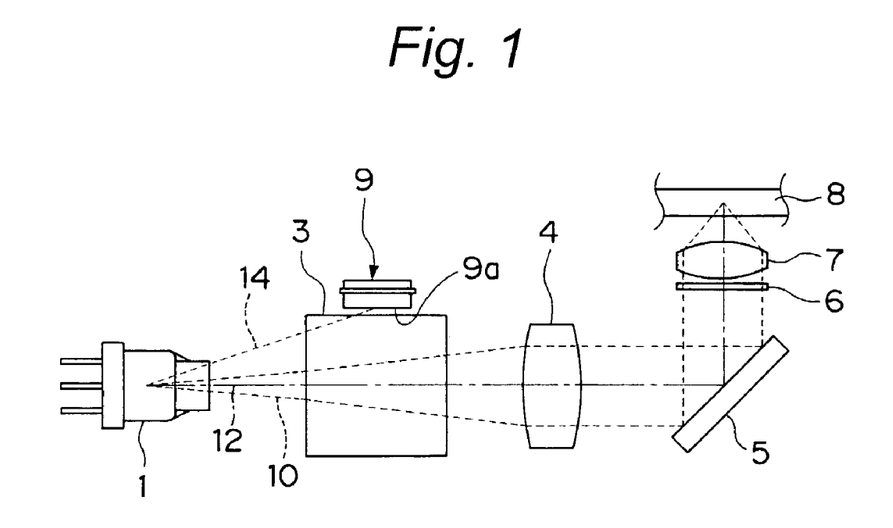
FIG. 1 is an illustration of the construction of an optical pickup device of a first embodiment of the present invention as viewed sideways.
Figure 2:
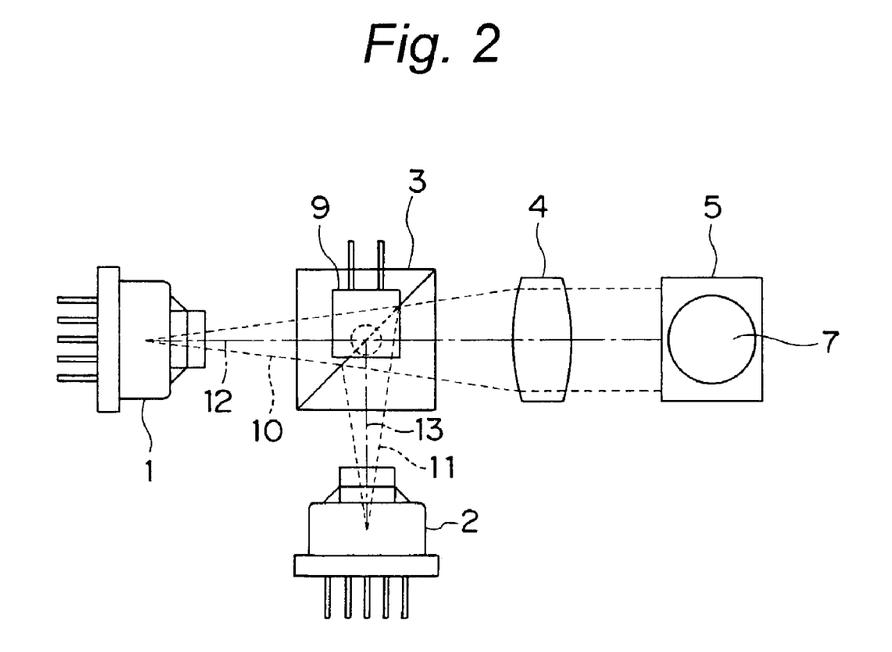
FIG. 2 is an illustration showing the construction of the optical pickup device of the first embodiment of the present invention as viewed from above.

FIG. 1 shows the construction of an optical pickup device of a first embodiment of the present invention as viewed sideways. FIG. 2 shows the construction of the optical pickup device as viewed from above.

As shown in FIGS. 1 and 2, the optical pickup device includes a first combination reception and emission device 1 serving as an example of the first light source emitting laser beams 10 to an optical disk 8 serving as an information-recording medium, a second combination reception and emission device 2 serving as an example of the second light source emitting laser beams 11 having a wavelength different from that of the laser beams 10 to the optical disk 8, a cube-shaped DBS 3, serving as an example of the optical element, via which the laser beams 10 and 11 travel, and a monitoring light detection element 9 disposed near and above the DBS 3. A collimator lens 4, a riser mirror 5, a quater-wave plate 6, and an objective lens 7 are disposed in an optical path between the DBS 3 and the optical disk 8.

An optical axis 12 of the laser beams 10 of the first combination reception and emission device 1 is not parallel with an optical axis 13 of the laser beams 11 of the second combination reception and emission device 2. The optical axis 12 and the optical axis 13 intersect each other almost at right angles at the DBS 3. The DBS 3 makes the optical axes 12 and 13 coincident with each other at its output side.

A light-receiving surface 9a of the monitoring light detection element 9 is almost parallel with the optical axes 12 and 13. The monitoring light detection element 9 is so disposed that laser beams 14 outside of the effective region coming from the first combination reception and emission device 1 are incident on the light-receiving surface 9a and that laser beams outside of the effective region coming from the second combination reception and emission device 2 are incident on the light-receiving surface 9a.

Although not shown, a light-emitting element and a light-receiving element for receiving light beams reflected by the optical disk 8 are mounted inside each of the first and second combination reception and emission devices 1 and 2. The light-emitting element and the light-receiving element inside each of the first and second combination reception and emission devices 1 and 2 are integral with each other.

In the optical pickup device having the above-described construction, the laser beams 10 in the effective region emitted by the first combination reception and emission device 1 pass through the DBS 103, then become parallel with one another, are bent perpendicularly by the riser mirror 5, pass through the quater-wave plate 6, and are condensed on a recording surface of the optical disk 8 by the objective lens 7. Light beams reflected by the optical disk 8 return to the first combination reception and emission device 1 travelling along a path same as when the light beams traveled to the optical disk, and are received by the light-receiving element inside the first combination reception and emission device 1. Based on electric signals outputted by the light-emitting element, information recorded on the optical disk 8 is detected.

The laser beams 11 in the effective region emitted by the second combination reception and emission device 2 are reflected by the DBS 3, and then travel forward via the collimator lens 4, the riser mirror 5, and the quater-wave plate 6, and are condensed on a recording surface of the optical disk 8 by the objective lens 7. Light beams reflected by the optical disk 8 return to the second combination reception and emission device 2 travelling along a path same as when the light beams traveled to the optical disk. Thus, the laser beams reflected by the optical disk 8 are received by the light-receiving element inside the second combination reception and emission device 2. Based on electric signals outputted by the light-emitting element, information recorded on the optical disk 8 is detected.

The laser beams emitted by the first and second combination reception and emission devices 1 and 2 have an elliptic intensity distribution with the radiant angle of the laser beams in a vertical direction being longer than that in a horizontal direction. On the other hand, the laser beams 10 and 11, in the effective region, condensed on the recording surface of the optical disk 8 are circular. Therefore, it can be said that the laser beams 14 outside of the effective region expand more in the vertical direction than in the horizontal direction.

The laser beams 14 outside of the effective region emitted by the first combination reception and emission device 1 impinge on the light-receiving surface 9a of the monitoring light detection element 9. The monitoring light detection element 9 outputs electric signals corresponding to a light amount of the received laser beams 14 outside of the effective region. The electric signals are supplied to an APC circuit to drive the APC circuit. The APC circuit controls the output of the first combination reception and emission device 1 so that the laser beams condensed on the recording surface of the optical disk 8 provide an appropriate power.

The laser beams outside of the effective region emitted by the second combination reception and emission device 2 are incident on the light-receiving surface 9a of the monitoring light detection element 9. The monitoring light detection element 9 outputs electric signals corresponding to a light amount of the received laser beams outside of the effective region. The electric signals are supplied to the APC circuit to drive the APC circuit. The APC circuit controls the output of the second combination reception and emission device 2 so that the laser beams condensed on the recording surface of the optical disk 8 have an appropriate power.

Because the light-receiving surface 9a of the monitoring light detection element 9 is almost parallel with the optical axes 12 and 13, more precisely, with a horizontal plane or planes containing the optical axes 12 and 13, the laser beams 14 outside of the effective region emitted by the first and second combination reception and emission devices 1 and 2 get incident on the light-receiving surface 9a of the monitoring light detection element 9. Therefore the amount of the laser beams received by the monitoring light detection element 9 does not change greatly among optical pickup devices. Consequently it is possible to reduce the adjusting range of the control gain of the APC circuit.

Because the monitoring light detection element 9 receives the laser beams 14 outside of the effective region emitted by the first/second combination reception and emission device 1, 2, the amount of the laser beams applied to the optical disk 8 is prevented from decreasing, and the recordable speed of the optical disk 8 can be increased.

Because only the single monitoring light detection element 9 receives the laser beams 14 outside of the effective region emitted by both the first and the second combination reception and emission devices 1 and 2, there is a decrease in the number of component parts necessary for controlling the output of the first and second combination reception and emission devices 1 and 2. Thereby the manufacturing costs can be held down.

The monitoring light detection element 9 is disposed near and above the DBS 3, with the light-receiving surface 9a thereof almost parallel with the optical axes 12 and 13. Therefore even if the monitoring light detection element 9 is dislocated to some extent from a predetermined position, the monitoring light detection element 9 does not interfere with the laser beams 10 and 11 in the effective region. Accordingly it is possible to prevent reduction of the performance, quality, and reliability of the optical pickup device.

Since the light-emitting element of the first and second combination reception and emission devices 1 and 2 is integral with the light-receiving element receiving the laser beams reflected by the optical disk 8, the number of component parts can be reduced.

In the first embodiment, the monitoring light detection element 9 is disposed near and above the DBS 3. However, the monitoring light detection element 9 may be disposed near and below the DBS 3. It will be easily understood that the light-receiving surface 9a of the monitoring light detection element 9 is disposed almost parallel with the optical axes 12 and 13 in this case, too.

The optical pick-up system of the first embodiment should perform at least one of reproduction, erase, and recording of information for the optical disk 8.

Needless to say, the kind of the optical disk 8 irradiated with the laser beams 10 of the first combination reception and emission device 1 is different from the kind of the optical disk 8 irradiated with the laser beams 11 of the second combination reception and emission device 2. For example, a CD may be irradiated with the laser beams 10 of the first combination reception and emission device 1, and a DVD may be irradiated with the laser beams 11 of the second combination reception and emission device 2.

Instead of the optical disk 8, a phase change optical disk or a magneto optical disk may be used.

As the first and second combination reception and emission devices 1 and 2, hologram laser elements and laser couplers can be used. As the light-emitting element inside the first and second combination reception and emission devices 1 and 2, a semiconductor laser device may be used.

(Second Embodiment)

Figure 3:
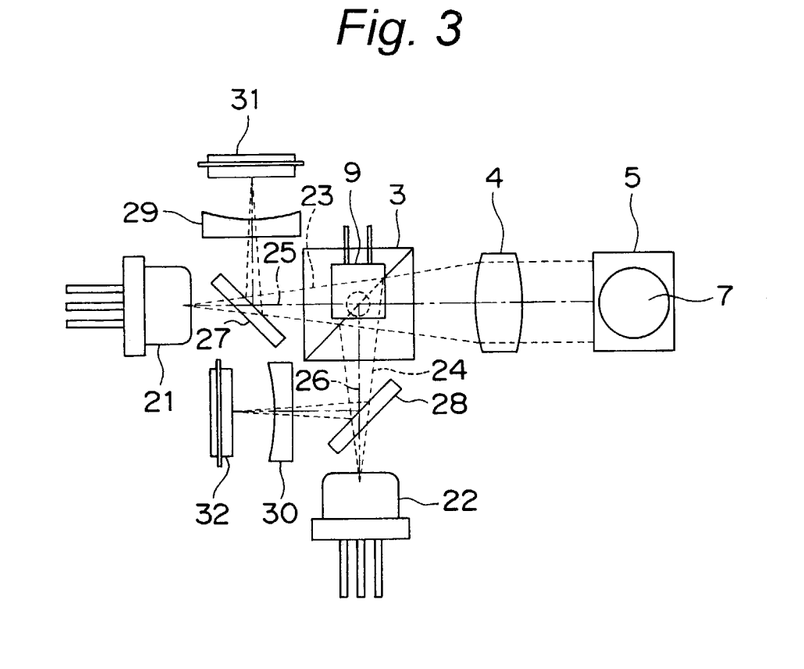
FIG. 3 is an illustration showing the construction of an optical pickup device of a second embodiment of the present invention as viewed from above.

FIG. 3 shows the construction of an optical pickup device of a second embodiment of the present invention as viewed from above. The same parts, shown in FIG. 3, as those shown in FIGS. 1 and 2 are denoted by the same reference numerals as those shown in FIGS. 1 and 2, and description thereof is omitted.

The optical pickup device shown in FIGS. 1 and 2 has the first and second combination reception and emission devices 1 and 2. In contrast, the optical pickup device of the second embodiment includes, as shown in FIG. 3, a first light-emitting element 21 as an example of the first light source for emitting laser beams 23 to an optical disk (not shown) and a second light-emitting element 22 as an example of the second light source emitting to the optical disk laser beams 24 having a wavelength different from that of the laser beams 23. The first and second light-emitting elements 21 and 22 are separate from light-receiving elements 31 and 32 for receiving light beams reflected by the optical disk. Beam splitters 27 and 28 and cylindrical lenses 29 and 30 are disposed in the optical paths between the DBS 3 and the light-receiving elements 31 and 32.

An optical axis 25 of the laser beams 23 of the first light-emitting element 21 is not parallel with an optical axis 26 of the laser beams 24 of the second light-emitting element 22. The optical axes 25 and 26 are almost orthogonal to each other at the DBS 3. The DBS 3 makes the optical axes 12 and 13 coincident with each other at its output side.

The light-receiving surface 9a (see FIG. 1) of the monitoring light detection element 9 is almost parallel with the optical axes 25 and 26. The monitoring light detection element 9 is so disposed that laser beams outside of the effective region emitted by the first and second light-emitting elements 21 and 22 are incident on the light-receiving surface 9a.

In the optical pickup device having the above-described construction, the laser beams 23 in the effective region emitted by the first light-emitting element 21 pass through the DBS 103, and then, become parallel with one another through the collimator lens 4, are bent perpendicularly by the riser mirror 5, pass through the quater-wave plate 6 (see FIG. 1), and are condensed on a recording surface of an optical disk by the objective lens 7. Travelling back long a path similar to the path along which beams traveled to the optical disk, light beams reflected by the optical disk pass through the DBS 3, reflected from the beam splitter 27, and enter the light-receiving element 31 through the cylindrical lens 29. Based on electric signals outputted by the light-receiving element 31, information recorded on the optical disk is detected.

After reflected by the DBS 3, the laser beams 24 in the effective region emitted by the second combination reception and emission device 22 travel via the collimator lens 4, the riser mirror 5, and the quater-wave plate 6 and are condensed on the recording surface of the optical disk by the objective lens 7. After travelling back along a path similar to the path along which beams traveled to the optical disk, the beams reflected by the optical disk are reflected by the DBS 3, and further reflected by the beam splitter 28, and finally enter the light-receiving element 32 through the cylindrical lens 30. Based on electric signals outputted by the light-receiving element 32, information recorded on the optical disk is detected.

Because the light-receiving surface 9a of the monitoring light detection element 9 is almost parallel with the optical axes 21 and 22, the laser beams outside of the effective region emitted by the first and second light-emitting elements 21 and 22 are incident on the light-receiving surface 9a of the monitoring light detection element 9. Therefore the amount of the laser beams received by the monitoring light detection element 9 does not change greatly among optical pickup devices. Consequently it is possible to reduce the adjustable range of the control gain of the APC circuit.

Because the monitoring light detection element 9 receives the laser beams outside of the effective region emitted by the first/second light-emitting element 21, 22, the amount of the laser beams applied to the optical disk does not decrease, and the recording speed of the optical disk can be increased.

Because only the single monitoring light detection element 9 is used to receive the laser beams outside of the effective region emitted by the first and the second light-emitting element 21, 22, the number of component parts necessary for controlling the outputs of the first and second light-emitting elements 21 and 22 decreases. Thus the manufacturing costs can be held down.

The monitoring light detection element 9 is disposed near and above the DBS 3, with the light-receiving surface 9a thereof almost parallel with the optical axes 25 and 26. Therefore even if the monitoring light detection element 9 is dislocated to some extent from a predetermined position, the monitoring light detection element 9 does not interfere with the laser beams 23 and 24 in the effective region. Accordingly it is possible to prevent reduction of the performance, quality, and reliability of the optical pickup device.

Since the first and second light-emitting elements 21 and 22 are separate from the light-receiving elements 31 and 32 receiving light beams reflected from the optical disk, it is possible to increase the freedom of designing of the optical system.

In the optical pickup device, many component parts are disposed around the first and second light-emitting elements 21 and 22. If the background-art optical pickup devices shown in FIGS. 14 through 16 are involved in a similar situation, it is difficult to place the monitoring light detection element in position. In contrast, in the second embodiment, since the monitoring light detection element 9 is disposed near and above the DBS 3, the monitoring light detection element 9 can be easily mounted.

In the second embodiment, the monitoring light detection element 9 is disposed near and above the DBS 3. However, the monitoring light detection element 9 may be disposed near and below the DBS 3. The light-receiving surface 9a of the monitoring light detection element 9 should be disposed almost parallel with the optical axes 25 and 26 also in this case.

The beam splitters 27 and 28 are used in the second embodiment. However, instead of the beam splitters 27 and 28, polarizing beam splitters may be used.

As the first and second light-emitting elements, semiconductor lasers may be used.

Figure 4:
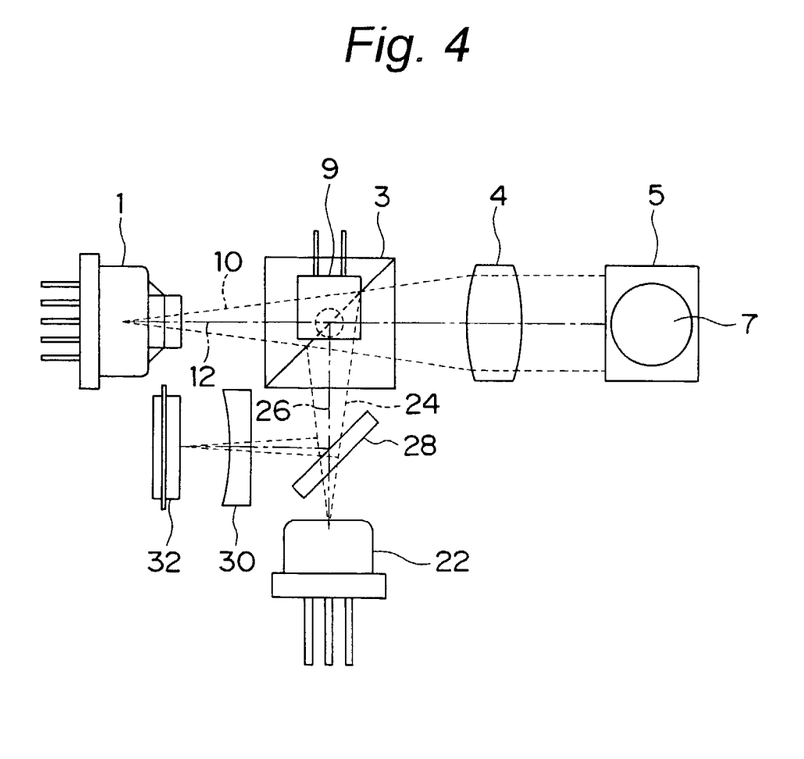
FIG. 4 is an illustration showing the construction of a modification of the optical pickup device of the second embodiment of the present invention as viewed from above.

Instead of the first light-emitting element 21, the first combination reception and emission device 1 shown in FIGS. 1 and 2 may be used, as shown in FIG. 4. In this case, the beam splitter 27, the cylindrical lens 29, and the light-receiving element 31 shown in FIG. 3 are not required. Therefore the FIG. 4 optical pickup device has a smaller number of component parts than the FIG. 3 optical pickup device.

In the case of the optical pickup device shown in FIG. 4, the monitoring light detection element 9 may be disposed near and below the DBS 3 in such a way that the light-receiving surface 9a is almost parallel with the optical axes 12 and 26.

Instead of the second light-emitting element 22, the second combination reception and emission device 2 shown in FIGS. 1 and 2 may be used. In this case also, the optical pickup device has a smaller number of component parts than the optical pickup device shown in FIG. 3.

In the case where the second combination reception and emission device 2 is used instead of the second light-emitting element 22, needless to say, the monitoring light detection element 9 can be also disposed near and below the DBS 3.

(Third Embodiment)

Figure 5:
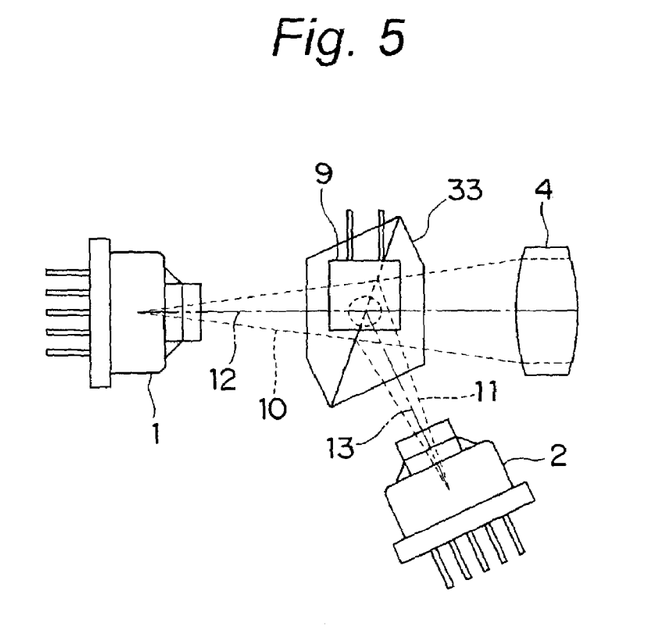
FIG. 5 is an illustration showing the construction of an optical pickup device of a third embodiment of the present invention as viewed from above.

FIG. 5 shows the construction of an optical pickup device of a third embodiment of the present invention viewed from above. The same parts, shown in FIG. 5, as those shown in FIGS. 1 and 2 are denoted by the same reference numerals as those shown in FIGS. 1 and 2, and description thereof is omitted.

The optical pickup device has a non-cubic DBS 33, serving as an optical element, disposed in such a way that laser beams of the first and second combination reception and emission devices 1 and 2 travel via the DBS 33. The monitoring light detection element 9 is disposed near and above the DBS 33. The light-receiving surface 9a (see FIG. 1) of the monitoring light detection element 9 is almost parallel with the optical axes 12 and 13. The optical axis 12 of the laser beams 10 is neither parallel nor orthogonal to the optical axis 13 of the laser beams 11. The DBS 33 makes the optical axes 12 and 13 substantially coincident with each other at an output side.

Similarly to the optical pickup device shown in FIGS. 1 and 2, the optical pickup device of the third embodiment includes the collimator lens 4, the riser mirror 5, the quater-wave plate 6, and the objective lens 7, although these component parts are not shown in FIG. 5.

In the optical pickup device having the construction, the monitoring light detection element 9 is disposed near and above the DBS 3, with the light-receiving surface 9a thereof almost parallel with the optical axes 12 and 13. Therefore the monitoring light detection element 9 is capable of efficiently receiving the laser beams outside of the effective region emitted by the first and second combination reception and emission devices 1 and 2.

The optical pickup device according to the present invention may have a DBS of not a cube-shape but of a complicated configuration as in the third embodiment. That is, the optical pickup device of the present invention may have a DBS with a shape of a polyhedron in which a surface receiving the laser beams 10 and a surface receiving the laser beams 11 incline non-orthogonally relative to each other. The DBS is capable of making two non-orthogonal optical axes substantially coincident with each other at the output side.

Needless to say, the optical pickup device of the third embodiment displays effects similar to those of the first embodiment.

In the third embodiment, the monitoring light detection element 9 is disposed near and above the DBS 33. However, the monitoring light detection element 9 may also be disposed near and below the DBS 33. In this case also, the light-receiving surface 9a of the monitoring light detection element 9 should be disposed almost parallel with the optical axes 12 and 13.

(Fourth Embodiment)

Figure 6:
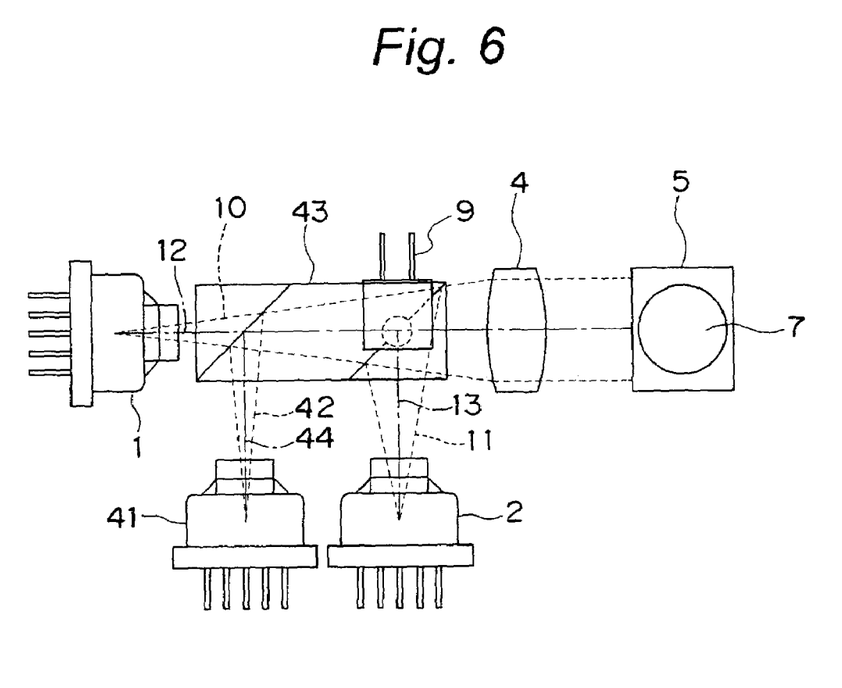
FIG. 6 is an illustration showing the construction of an optical pickup device of a fourth embodiment of the present invention as viewed from above.

FIG. 6 shows the construction of an optical pickup device of a fourth embodiment of the present invention viewed from above. The same parts, shown in FIG. 6, as those shown in FIGS. 1 and 2 are denoted by the same reference numerals as those shown in FIGS. 1 and 2, and description thereof is omitted.

The optical pickup device includes a third combination reception and emission device 41 serving as an example of the third light source. The third combination reception and emission device 41 emits laser beams 42 having a wavelength different from the wavelengths of the laser beams 10 and 11 of the first and second combination reception and emission devices 1 and 2 to an unshown optical disk. The optical pickup device has a rectangular solid-shaped DBS 43, serving as an optical element, disposed in such a way that laser beams 10, 11, and 42 of the first, second, and third combination reception and emission devices 1, 2, and 41 travel via the DBS 43.

The optical axis 12 of the laser beams 10 is not parallel with the optical axis 11 of the second combination reception and emission device 2 or the optical axis 42 of the third combination reception and emission device 41. The optical axis 13 is substantially parallel with the optical axis 44. The optical axis 12 is substantially orthogonal to the optical axes 13 and 44. The DBS 43 makes the optical axes 12, 13, and 44 substantially coincident with one another at its output side.

A light-receiving surface 9a (see FIG. 1) of the monitoring light detection element 9 is almost parallel with the optical axes 12, 13, and 44. The monitoring light detection element 9 is disposed such that laser beams outside of the effective region emitted by the first combination reception and emission device 1 are incident on the light-receiving surface 9a and that laser beams outside of the effective region emitted by the second combination reception and emission device 2 are incident on the light-receiving surface 9a. More specifically, the monitoring light detection element 9 is disposed above a position where the optical axes 12 and 13 intersect with each other and in the vicinity of the DBS 43.

Although not shown, a light-emitting element and a light-receiving element receiving light beams reflected by the optical disk are built in the third combination reception and emission device 41. The light-emitting element and the light-receiving element are combined and integral with each other.

In the optical pickup device having the construction, the wavelength of the laser beams 42 emitted by the third combination reception and emission device 41 is different from the wavelengths of the laser beams 10 and 11 emitted by the first and second laser beams 1 and 2 respectively. Therefore the third combination reception and emission device 41 is capable of performing at least one of reproduction, erase, and recording of information for an optical disk which cannot be processed by the first and second laser beams 1 and 2.

Needless to say, the optical pickup device of the fourth embodiment displays effects similar to those of the first embodiment.

A quater-wave plate 6 (see FIG. 1) is disposed between the riser mirror 5 and the objective lens 7 although not shown in FIG. 6.

In the fourth embodiment, the monitoring light detection element 9 is disposed near and above the DBS 43. However, the monitoring light detection element 9 may be disposed near and below the DBS 43. In this case as well, the light-receiving surface 9a of the monitoring light detection element 9 should be disposed almost parallel with the optical axes 12 and 13.

(Fifth Embodiment)

Figure 7:
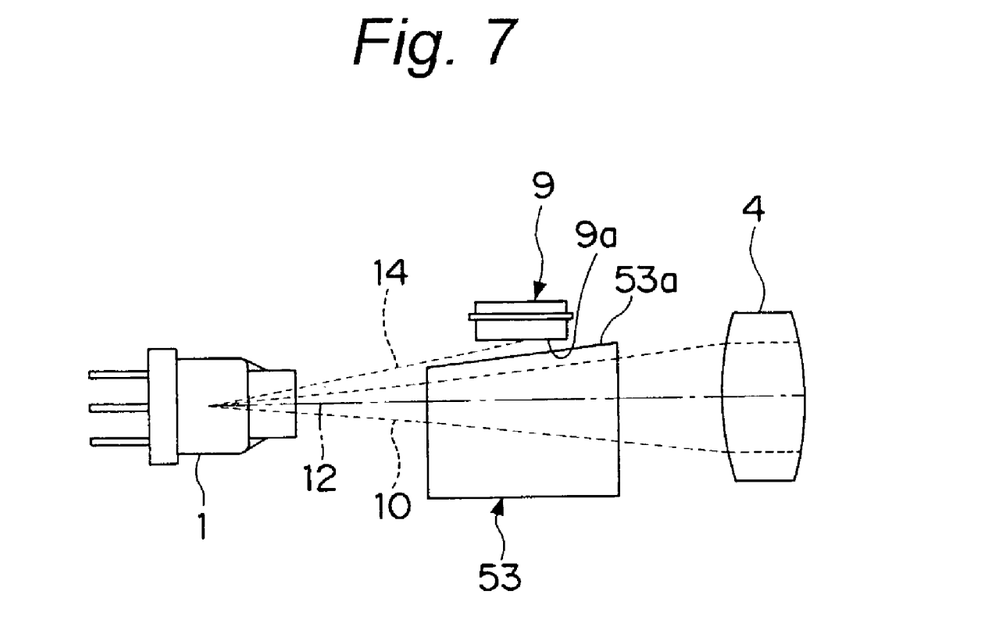
FIG. 7 is an illustration showing the construction of an optical pickup device of a fifth embodiment of the present invention as viewed sideways.

FIG. 7 shows the construction of an optical pickup device of a fifth embodiment of the present invention as viewed sideways. The same parts, shown in FIG. 7, as those shown in FIGS. 1 and 2 are denoted by the same reference numerals as those shown in FIGS. 1 and 2, and description thereof is omitted.

The optical pickup device has a DBS 53 which is an example of an optical element. The DBS 53 is cut at its upper part to such an extent that the DBS 53 does not interfere with the laser beams 10 in the effective region emitted by the first combination reception and emission device 1. That is, the DBS 53 is thinned to such an extent that an upper surface 53a thereof does not interfere with the laser beams 10 in the effective region emitted by the first combination reception and emission device 1. The upper surface (the surface of the DBS 53 at the side of the monitoring light detection element 9) 53a of the DBS 53 inclines to a plane or planes including the optical axes 12 and 13 (see FIG. 2) of the laser beams 10 and 11.

In the fifth embodiment, the DBS 53 is thinned to such an extent that the upper surface 53a of the DBS 53 does not interfere with the laser beams 10 in the effective region emitted by the first combination reception and emission device 1. Alternatively, the DBS 53 may be thinned to such an extent that the upper surface 53a of the DBS 53 does not interfere with the laser beams 11 (see FIG. 2) in the effective region emitted by the second combination reception and emission device 2. It is also possible to thin the DBS 53 to such an extent that the upper surface 53a of the DBS 53 does not interfere with the laser beams 10 in the effective region emitted by the first combination reception and emission device 1 nor interfere with the laser beams 11 in the effective region emitted by the second combination reception and emission device 2.

The monitoring light detection element 9 may be disposed close to and below the DBS 53. In this case, the lower surface of the DBS 53 should incline to the plane(s) including the optical axes 12 and 13 of the laser beams 10 and 11.

(Sixth Embodiment)

Figure 8:
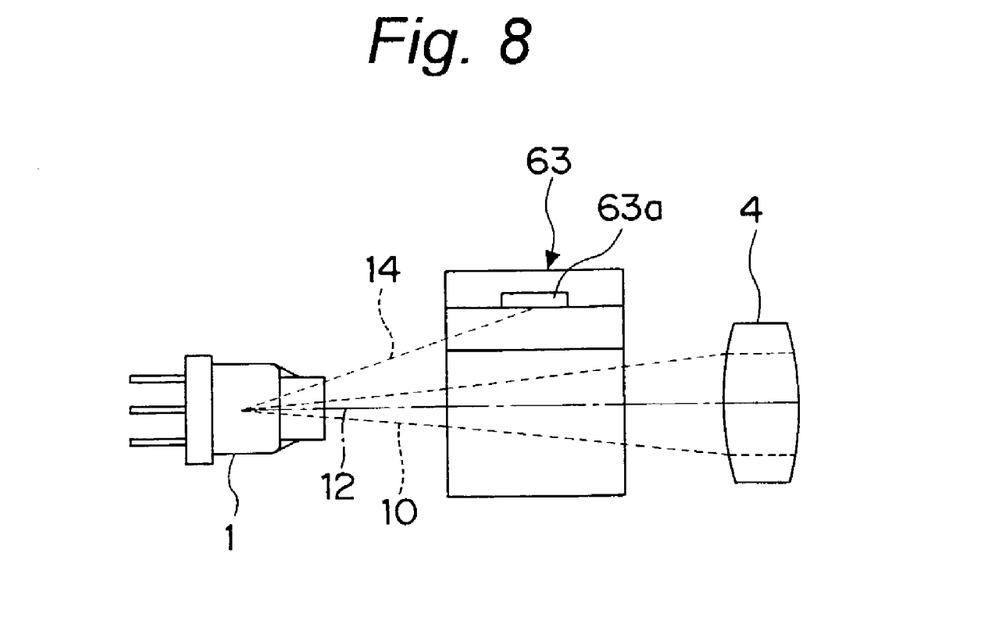
FIG. 8 is an illustration showing the construction of an optical pickup device of a sixth embodiment of the present invention as viewed sideways.

FIG. 8 shows the construction of an optical pickup device of a sixth embodiment of the present invention as viewed sideways. The same parts, shown in FIG. 8, as those shown in FIGS. 1 and 2 are denoted by the same reference numerals as those shown in FIGS. 1 and 2, and description thereof is omitted.

The optical pickup device includes, as an optical element, a composite element 63 having the function of the DBS and that of the monitoring light detection element. The composite element 63 has a light detection portion 63a serving as the monitoring light detection element at its upper part. Laser beams 14 outside of the effective region emitted by the first combination reception and emission device 1 are incident on the light detection portion 63a. Thereby the laser beams 14 are detected as monitoring signals so that the output of the first combination reception and emission device 1 is APC-controlled.

Since the optical pickup device has the composite element 63 having the function of the DBS and that of the monitoring light detection element, the number of component parts can be reduced.

Also, since the composite element 63 is used, there does not occur a situation in which a separate monitoring light detection element is bonded in a wrong position or dislocated. Thus there is no fear that the laser beams in the effective region are partially blocked or interrupted (i.e., vignetting) by the monitoring light detection element.

Furthermore, since the composite element 63 is used, change in temperature hardly influences light reception at the light detection portion 63a.

In the sixth embodiment, the light detection portion 63a is disposed at the upper part of the composite element 63. But instead, the light detection portion 63a may be disposed at a lower part of the composite element 63.

Figure 9:
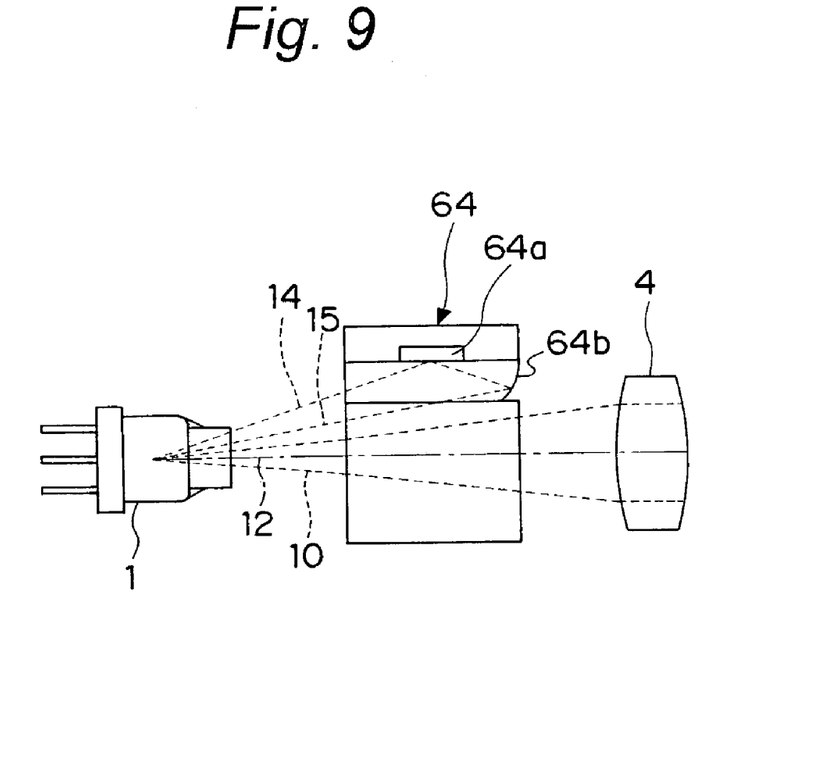
FIG. 9 is an illustration showing the construction of a modification of the optical pickup device of the sixth embodiment of the present invention as viewed sideways.

As shown in FIG. 9, a composite element 64 having the function of the DBS and that of the monitoring light detection element may be used instead of the composite element 63. At an upper part of the composite element 64, there is provided a light detection portion 64a, serving as the monitoring light detection element, on which the laser beams 14 outside the effective region are incident. A reflection mirror 64b serving as the first reflection mirror is disposed at a portion of an end surface confronting the collimator lens 4 of the composite element 64. The reflection mirror 64b reflects laser beams 15 outside of the effective region emitted by the first combination reception and emission device 1 to thereby lead the laser beams 15 to the light detection portion 64a. At this time, there is no decrease in the amount of laser beams that directly enter the light detection portion 64a, without being reflected from the reflection mirror 64b. Accordingly, there is an increase in the amount of incident laser beams of the first combination reception and emission device 1 that enter the light detection portion 64a. Thus the APC circuit controls the output of the first combination reception and emission device 1 reliably.

Figure 10:
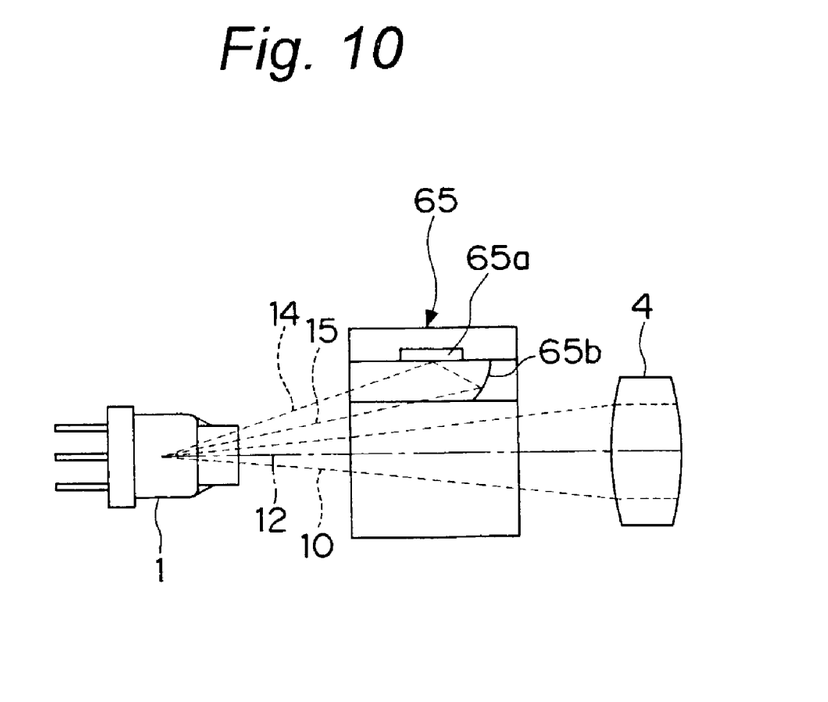
FIG. 10 is an illustration showing the construction of a modification of the optical pickup device of the sixth embodiment of the present invention as viewed sideways.

Instead of the composite element 63, as shown in FIG. 10, a composite element 65 also having the function of the DBS and that of the monitoring light detection element may be used. At an upper part of the composite element 65, there is provided a light detection portion 65a, serving as the monitoring light detection element, on which the laser beams 14 outside the effective region are incident. A reflection mirror 65b serving as the first reflection mirror is disposed deep inside the composite element 65. That is, the reflection mirror 65b is embedded in the composite element 65 and not exposed to the outside. The reflection mirror 65b reflects the laser beams 15 outside of the effective region emitted by the first combination reception and emission device 1 to thereby lead the laser beams 15 to the light detection portion 64a. At this time, there is no decrease in the amount of the laser beams that directly enter the light detection portion 65a, without being reflected from the reflection mirror 65b. Accordingly, there occurs an increase in the amount of incident laser beams from the first combination reception and emission device 1 that enter the light detection portion 65a, so that the APC (automatic power control) operation of the output of the first combination reception and emission device 1 is reliably performed.

If an adhesive agent for fixing the composite element 65 is applied to the neighborhood of the reflection mirror 65b, the adhesive agent may corrode the reflection surface of the reflection mirror 65b. However, since the reflection mirror 65b is disposed deep inside the composite element 65 so that the reflection surface of the reflection mirror 65b is not exposed to the outside, the reflection surface of the reflection mirror 65b is prevented from being corroded or deteriorated by such a fixing adhesive agent or other causes.

The reflection mirrors 64b and 65b shown in FIGS. 9 and 10 are concave mirrors, but may be plane mirrors. That is, the reflection mirrors 64b and 65b can assume any configuration so long as the reflection mirrors 64b and 65b are able to reflect the laser beams 15 outside of the effective region coming from the first combination reception and emission device 1, so as to lead the reflected laser beams the light detection portion 64a, 65a.

Figure 11:
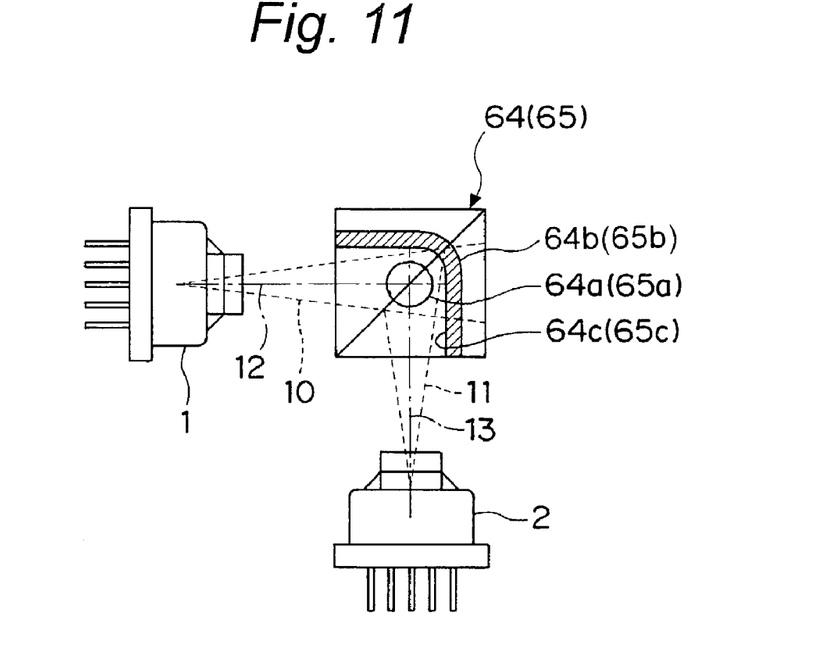
FIG. 11 is an illustration showing the construction of a modification of the optical pickup device of the sixth embodiment of the present invention as viewed from above.

The reflection surface 64c of the reflection mirror 64b and the reflection surface 65c of the reflection mirror 65b may be curved, as shown in FIG. 11, to lead laser beams traveling from two different directions to the light detection portions 64a and 65a. More specifically, the reflection surfaces 64c and 65c of the reflection mirrors 64b and 65b may be curved to reflect the laser beams outside of the effective region emitted from the first and second combination reception and emission devices 1 and 2 and lead them to the light detection portions 64a and 65a. This arrangement realizes an increase in the amount of the laser beams of the first and second combination reception and emission devices 1 and 2 that enter the light detection portions 64a and 65a. Thus, a reliable APC operation for the outputs of the first and second combination reception and emission devices 1 and 2 is achievable.

By using the reflection mirror having a configuration as shown in FIG. 11, it is possible to cope with laser beams emitted by a plurality of light sources. Thus the APC operation for all the outputs of the plurality of light sources is performed reliably.

(Seventh Embodiment)

Figure 12:
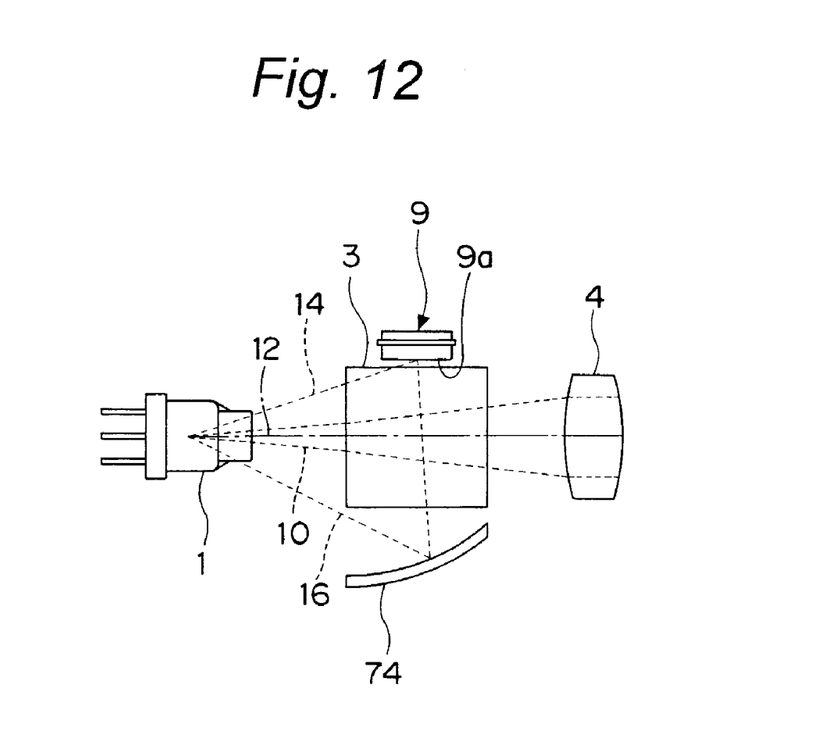
FIG. 12 is an illustration showing the construction of an optical pickup device of a seventh embodiment of the present invention as viewed sideways.

FIG. 12 shows the construction of an optical pickup device of a seventh embodiment of the present invention as viewed sideways. The same parts, shown in FIG. 12, as those shown in FIGS. 1 and 2 are denoted by the same reference numerals as those shown in FIGS. 1 and 2, and description thereof is omitted.

In the optical pickup device, a reflection mirror 74 serving as the second reflection mirror is disposed near and below the DBS 3. The reflection mirror 74 reflects laser beams 16 outside of the effective region emitted by the first combination reception and emission device 1 so as to lead the laser beams 16 to the light-receiving surface 9a of the monitoring light detection element 9.

In the optical pickup device having the construction, laser beams 14 outside of the effective region traveling upward impinge directly on the light-receiving surface 9a of the monitoring light detection element 9, without being reflected by the reflection mirror 74. On the other hand, laser beams 16 outside of the effective region traveling downward are reflected by the reflection mirror 74 and impinge on the light-receiving surface 9a of the monitoring light detection element 9. Therefore, there is an increase in the amount of the laser beams incident on the light-receiving surface 9a of the monitoring light detection element 9. Thus, a reliable APC operation for the output of the first combination reception and emission device 1 is achievable.

Figure 13:
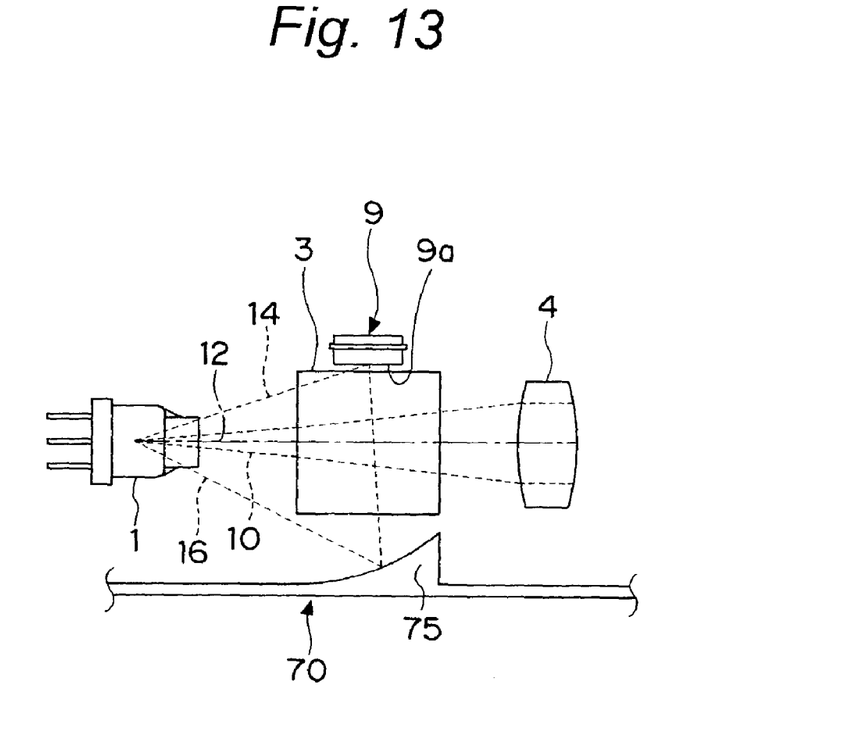
FIG. 13 is an illustration showing the construction of a modification of the optical pickup device of the seventh embodiment of the present invention as viewed sideways.

As shown in FIG. 13, instead of the reflection mirror 74, a reflection mirror 75 serving as the second reflection mirror may be provided at a casing 70. The reflection mirror 75 is integral with the casing 70. The reflection mirror 75 has a function similar to that of the reflection mirror 74 shown in FIG. 12. That is, the reflection mirror 75 reflects the downward laser beams 16 outside of the effective region, emitted by the first combination reception and emission device 1, and leads the reflected laser beams 15 to the light-receiving surface 9a of the monitoring light detection element 9. The casing 70 accommodates the DBS 3 and the collimator lens 4. The casing 70 may also accommodate the first and second combination reception and emission devices 1 and 2 and the monitoring light detection element 9b as well.

The reflection mirrors 74 and 75 shown in FIGS. 12 and 13 respectively are concave mirrors, but may be plane mirrors. In other words, the reflection mirrors 74 and 75 can assume any configuration so long as the reflection mirrors 74 and 75 are able to reflect the downward laser beams 16 outside of the effective region coming from the first combination reception and emission device 1, so as to lead the reflected laser beams to the light-receiving surface 9a of the monitoring light detection element 9.

The reflection mirrors (second reflection mirrors) 74, 75 for the downward laser beams 16 outside of the effective region may be used in combination with the reflection mirrors (first reflection mirrors) 64b, 65b for the upward laser beams 14 outside of the effective region. In this case, the amount of incident light upon the light receiving surface 9a of the monitoring light detection element 9 is further increased.

The reflection surfaces of the reflection mirrors 74 and 75 may be curved to lead laser beams traveling from two different directions to the monitoring light detection element 9.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical pickup device performing at least one of operations of reproduction, erase, and recording of information upon an information-recording medium, comprising:
   a first light source emitting laser beams to an information-recording medium;
   a second light source emitting laser beams to an information-recording medium, the laser beams of the second light source having a wavelength different from that of the laser beams of the first light source and having an optical axis not parallel with that of the laser beams of the first light source;
   an optical element disposed such that the laser beams emitted by the first and second light sources travel via the optical element, the optical element making optical axes of the laser beams of the first and second light sources substantially coincident with each other at an output side of the optical element; and
   a monitoring light detection element receiving a part of the laser beams emitted by the first and second light sources,
   wherein the monitoring light detection element has a light-receiving surface substantially parallel with the optical axes of the laser beams of the first and second light sources.

2. The optical pickup device according to claim 1, wherein at least one of the first and second light sources comprises a combination reception and emission device in which a light-emitting element is combined with a light-receiving element which receives laser beams reflected by the information-recording medium.

3. The optical pickup device according to claim 1, wherein at least one of the first and second light sources comprises a light-emitting element, and the light-emitting element is separate from a light-receiving element which receives laser beams reflected by the information-recording medium.

4. The optical pickup device according to claim 1, wherein the axis of the laser beams of the first light source is not orthogonal to the axis of the laser beams of the second light source; and
   the optical element is a polyhedron in which a surface of the polyhedron for receiving the laser beams of the first light source and a surface of the polyhedron for receiving the laser beams of the second light source non-orthogonally incline relative to each other.

5. The optical pickup device according to claim 1, further comprising a third light source emitting laser beams to the information-recording medium, the laser beams of the third light source having a wavelength different from the wavelengths of the laser beams of the first and second light sources, wherein the optical element makes the optical axes of the laser beams of the first, second and third light sources substantially coincident with one another at an output side thereof.

6. The optical pickup device according to claim 1, wherein a surface of the optical element at a side of the monitoring light detection element inclines relative to a plane or planes including the optical axes of the laser beams of the first and second light sources.

7. The optical pickup device according to claim 1, wherein the optical element and the monitoring light detection element are integral with each other.

8. The optical pickup device according to claim 7, wherein a first reflection mirror for increasing laser beams incident on the light-receiving surface of the monitoring light detection element is disposed on an end surface of the optical element.

9. The optical pickup device according to claim 7, wherein a first reflection mirror for increasing laser beams incident on the light-receiving surface of the monitoring light detection element is embedded in the optical element; and the reflection mirror not exposed the outside.

10. The optical pickup device according to claim 8, wherein a reflection surface of the first reflection mirror is curved to lead laser beams traveling from two different directions to the light-receiving surface of the monitoring light detection element.

11. The optical pickup device according to claim 9, wherein a reflection surface of the first reflection mirror is curved to lead laser beams traveling in two different directions to the light-receiving surface of the monitoring light detection element.

12. The optical pickup device according to claim 1, wherein a second reflection mirror for increasing laser beams incident on the light-receiving surface of the monitoring light detection element is disposed close to the optical element.

13. The optical pickup device according to claim 12, wherein the second reflection mirror is formed by using apart of a casing accommodating the first light source, the second light source, the optical element, and the monitoring light detection element.

* * * * *